FLIGHT CONTROL SYSTEM
WITH ADJUSTABLE GAIN (K)

MODEL REFERENCE SYSTEM
(PRIOR SYSTEM #1)

ENERGY BALANCE SYSTEM
(PRIOR SYSTEM #2)

ACTIVE FILTER 23

INVENTOR.
RICHARD E. ANDEEN
BY
ATTORNEY

May 27, 1969

R. E. ANDEEN 3,446,946

POWER-MOMENT SELF-ADAPTIVE CONTROL SYSTEM

Filed Dec. 1, 1964

POWER DENSITY SPECTRUM OF $\epsilon$

POWER DENSITY SPECTRUM OF $\epsilon$
FLIGHT CONDITION #1
$K_1 < K_2 < K_3$

MEAN-SQUARED-ERROR
VS. GAIN K

POWER DENSITY SPECTRUM OF $\epsilon$
$K_1 < K_2 < K_3$

POWER DENSITY SPECTRUM OF $\epsilon$
FLIGHT CONDITION #2
$K_1 < K_2 < K_3$

INVENTOR.
RICHARD E. ANDEEN
BY
ATTORNEY

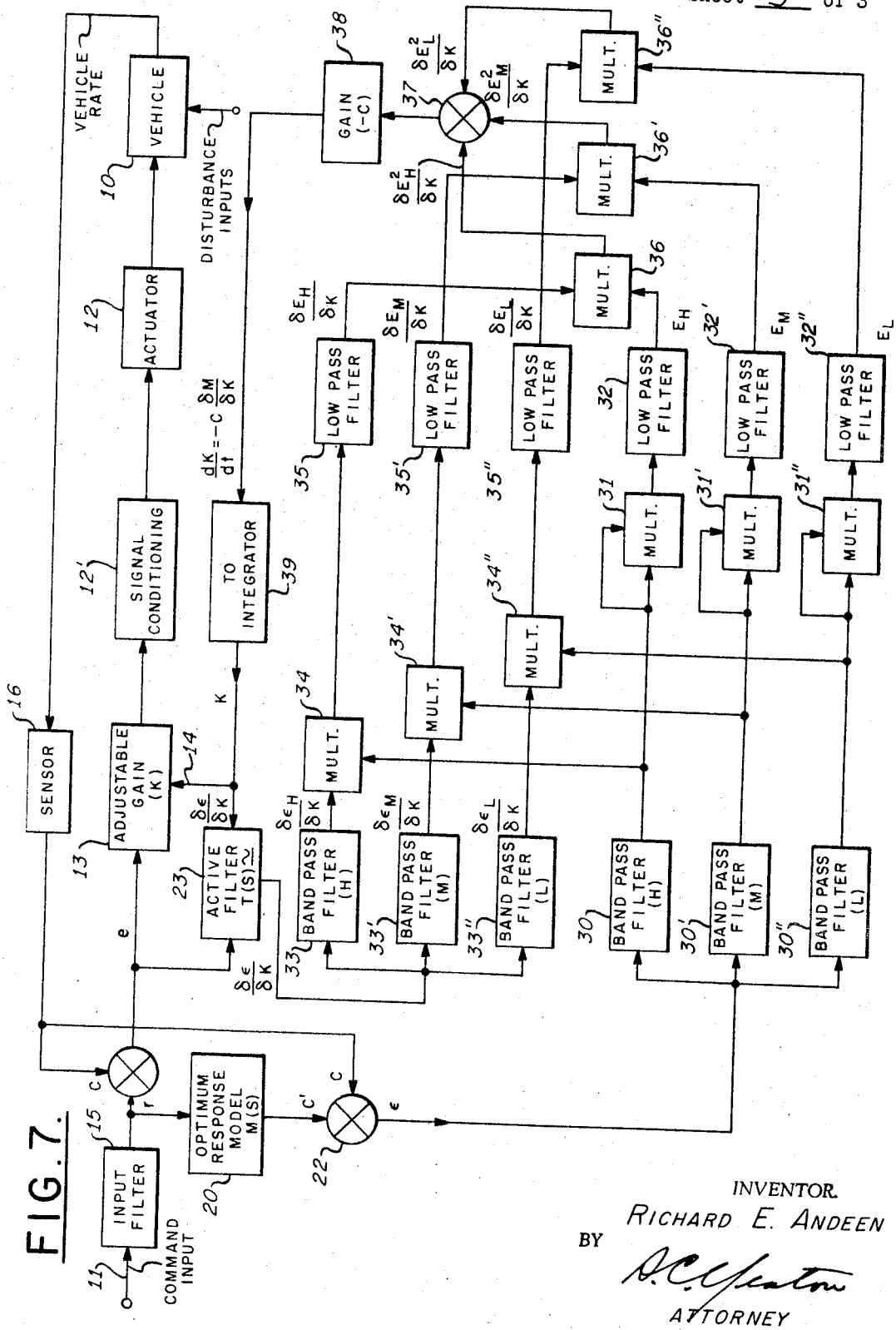

United States Patent Office 3,446,946
Patented May 27, 1969

3,446,946
POWER-MOMENT SELF-ADAPTIVE CONTROL SYSTEM
Richard E. Andeen, Phoenix, Ariz., assignor to Sperry Rand Corporation, Great Neck, N.Y., a corporation of Delaware
Filed Dec. 1, 1964, Ser. No. 415,125
Int. Cl. G06f *15/18;* G05b *13/02;* B64c *13/50*
U.S. Cl. 235—150.1
7 Claims

ABSTRACT OF THE DISCLOSURE

A self-adaptive control, for aircraft flight control systems for example, which combines the principles of an optimum model reference type of control and an "energy-balance" type of control to provide an improved system having advantages not obtainable by either alone. Basically, the self-adaptive control adjusts the over-all system gain so as to match the response of the actual system to that of an optimum response model while at the same time considering and maximizing the stability of the overall system (minimum moment).

---

The present invention relates generally to feedback control systems, and more specifically, to feedback control systems capable of automatically adjusting their own control parameters to maintain optimum response under widely varying operating conditions, such conditions existing both within the control system itself (component tolerances, aging, etc.) and external to it (environment). Such systems have in recent years been referred to as self-adaptive or self-optimizing control systems.

An example of a feedback control system to which the principles of my invention may be readily applied is an aircraft automatic pilot system and it is in this situs that my invention will be described in detail. However, it is to be understood that this situs is only for explanative purposes and that in practice the teachings of this invention may be applied to any feedback or closed-loop control system such as automatic machine tool control systems, chemical processing systems, or other automated operations.

In modern jet aircraft, as well as in missiles, boosters and re-entry vehicles, the automatic flight control system must be capable of operating with optimum response not only during very high aerodynamic speeds but also at relatively very low speeds such as those experienced during take-off and landing. It is therefore desirable that such a system be capable of adapting its operation to these aerodynamic changes as well as to changes within the system itself, such as, for example, changes in component tolerances, aging and the like. Also, such systems should be capable of adapting itself to changes in the aerodynamic configuration of the vehicle, for example, variable geometry aerodynamic surfaces, changes due to fuel consumption, etc. The self-adaptive control system of the present inventment will automatically maintain the operation of an autopilot/aircraft feedback control system (over-all control loop) at an optimum under all the foregoing conditions. The invention disclosed herein is a significant improvement over that disclosed in my co-opending joint application Ser. No. 281,513 filed May 20, 1963, now U.S. Patent 3,216,676 entitled "Self Adaptive Control System" and assigned to the same assignee as the present invention. Its relation to the present invention is described in detail hereinbelow.

A number of self-adaptive control systems have been proposed in the past and with some measure of success. However, in most cases these systems have been limited in their capabilities of self-adaptation for one reason or another. Some systems have used auxiliary or test signals which tend to upset the operation of the control system and/or many have required a sustained limit cycle oscillation of the control system to sense the need for adaptation and/or many tend to adjust the parameters of the control system to minimize errors at the expense of adequate stability, and/or many tend to become confused when repeated commands are introduced into the control system or conditions change so as to cause a major shift in the important frequencies of the dynamic characteristics of the autopilot/aircraft feedback control system. The self-adaptive control system of the present invention achieves complete optimization of the autopilot/aircraft feedback control system without the above mentioned undesirable effects; the criterion used for adaptation is the minimization of the moment of the power density spectrum of the system response error; this moment being computed by the self-adaptive system from the information reflected in the ordinary operating signals of the autopilot/aircraft feedback control system by the use of filters, multipliers, and other conventional signal processing circuits.

It is therefore a primary object of the present invention to provide a self-adaptive feedback control system in which one or more of the system gains are adjusted so as to minimize the moment of the power density spectrum of the system response error, viz., a power-moment self-adaptive control system.

It is a further object of the present invention to provide a self-adaptive control system in which one or more of the system gains are adjusted so as to match the response of the feedback control system to that of an optimum response model in a least squares sense while at the same time considering and maximizing the stability of the overall system (minimum moment).

A further object of the present invention is to provide a self-adaptive control for a feedback control system wherein the system gain adjustments are computed in separate frequency bands of the response error signal whereby allowing the system to adjust faster to high frequency effects and relatively slowly to lower frequency effects, i.e. the adaptation rate is made consistent with the frequency range in which the effect necessitating adaptation occurs.

A still further object of the present invention is to provide a control system of the foregoing character wherein the self-adaptive control automatically determines whether the parameters being adjusted should be increased or decreased to improve the error signal in each frequency band.

Other objects and advantages of the system of the present invention will become apparent as a description of a preferred embodiment thereof proceeds, reference being made therein to the accompanying drawings wherein:

FIG. 7 is a block diagram of a complete self-adaptive control system incorporating the teachings of the present invention;

As mentioned in the foregoing, self-adaptive control systems have been previously proposed with various measures of success; two of these are described below for the purposes of clearly bringing out the unique structural features and operational advantages of the present invention.

Figure 1:
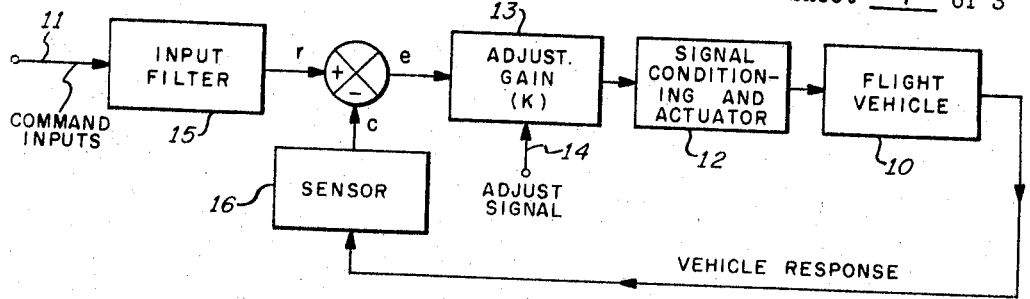
FIG. 1 is a block diagram of a typical feedback control system, specifically a control channel of an automatic pilot for an aircraft, to which the teachings of the present invention are applicable.

FIG. 1 is a block diagram which represents in simplified form the basic configuration of a feedback control system, specifically an automatic flight control system which, for example, may be used to control the pitch attitude rate of a high performance aircraft, it being understood that the principles may also apply to other control axes of the aircraft. The typical flight control system of FIG. 1 comprises a flight vehicle 10 subject to movements induced by pilot input commands inserted by any conventional means at 11, and/or external disturbances such as gusts, etc., and/or internal disturbances such as changes in loading due to fuel burn-off, changes in aerodynamic configuration, changes in component tolerances, and the like. The vehicle response to these motions are sensed by a conventional sensor 16 carried by the craft, such as, for example, a rate gyro. The craft control surface is positioned by a conventional actuator system 12 which may include the usual shaping circuits, power amplifiers, etc. The gain of the over-all feedback system, which in the present example is the controllable parameter of the system is controlled by a suitable adjustable gain control means 13 such as an adjustable gain amplifier having an adjustable gain characteristic K and which is varied by an adjust signal applied at 14 to optimize the response of the over-all system loop. The adjust signal may be developed by any of a number of self-adaptive systems such as those mentioned hereinabove. The command input 11 may be passed through the usual input filter 15, which may be a simple smoothing network, the output $r$ of which is combined degeneratively with the system output response $c$, viz. the rate gyro output, the resultant signal $e$ representing the response error of the actual system. The signal $e$ will be referred to herein as the primary system error.

In the following descriptions of two prior self-adaptive controls as well as of the self-adaptive control of the present invention, the criteria upon which their principles of operation are based is the power density of the frequency spectrum of the response error of the system, typical curves representing the power density spectra of the described systems being illustrated in FIGS. 4, 6, 8 and 9 of the accompanying drawings. The derivation of these curves is fully described in my above-mentioned co-pending joint application Ser. No. 281,513, and, therefore, since such derivation is conventional to those familiar with the art of feedback control system analysis, it will not be repeated herein.

*Discussion of prior systems*

Figure 2:
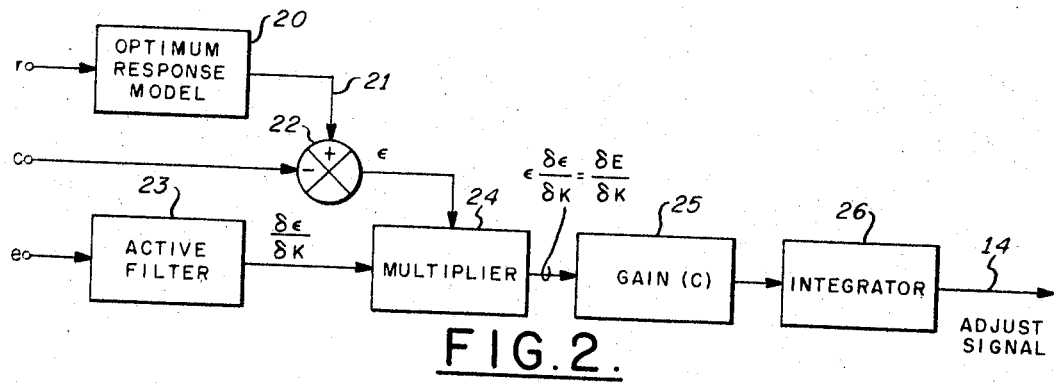
FIGS. 2 and 3 are block diagrams of prior adaptive systems which are included herein to facilitate an understanding of the teachings of the present invention.

One of the prior types of self-adaptive systems is known as a Model-Reference or Performance Model Self-Adaptive System such as that disclosed in U.S. Patent No. 2,862,167 to Curry which is assigned to the same assignee as the present invention. The basic configuration of the self-adaptive portion of this system is illustrated in FIG. 2 and its principle of operation may be explained by reference to FIGS. 4 and 5. In FIG. 2 the inputs to this adaptive system correspond to the correspondingly identified signals of FIG. 1 and its output is connected with input 14 of the adjustable gain circuit 13 of FIG. 1. Thus, system command inputs $r$, such as pilot's commands, are applied to an optimum response model 20 which, as taught in the above-noted Curry patent, comprises an electronic analog of the ideal system having an ideal or desired response characteristic and supplying an output 21 representative thereof. This output is compared at 22 (which may be a simple summing circuit) with the response $c$ of the actual system, producing an output $\epsilon$ corresponding to the response error between the ideal and actual.

Figure 4:
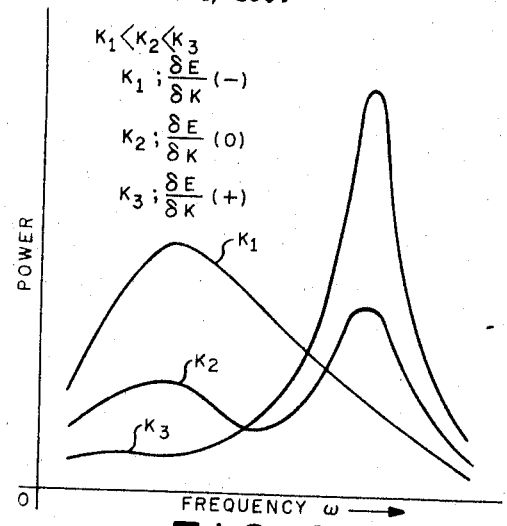
FIGS. 4, 5 and 6 are graphs useful in explaining the operation of the systems of FIGS. 2 and 3.

Referring for the moment to FIG. 4, a typical power density spectrum of the response error signal $\epsilon$ of FIG. 2 is illustrated. This spectrum is presented at a particular condition of flight (for example, some fixed airspeed and loading) for several values of the adjustable gain K as shown. As set forth in the above-referenced application, the power density spectrum graphically presents the relative amount of power associated with the various frequencies of the response error signal, and also that the total power, represented in FIG. 4 by the area under any of the curves for the various values of K, represents the mean-squared-error for that value of K. The equation may be written $$E = \overline{\epsilon^2(t)} = \frac{1}{\pi}\int_{\infty}^{\infty} \Phi(\omega)d\omega \qquad (1)$$

where E is defined as the total power, $\epsilon^2(t)$ is the mean-squared-error (which usually can only be measured approximately) and $\Phi(\omega)$ represents the amplitude of the power density spectrum of the response error at any given frequency $\omega$.

Figure 5:
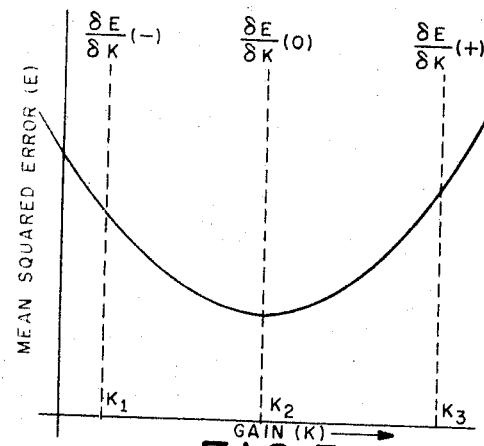

The objective of the operation of the model-reference self-adaptive system of FIG. 2 is to minimize the mean-squared-error. How this is accomplished may be illustrated by reference to FIGS. 2, 4 and 5. FIG. 5 shows how E, the mean-squared-error, typically varies with K, the system gain. When K is too small $\partial E/\partial K$, the rate of change of E with K, is negative and K should be increased to attain the minimum of E. When K is too large $\partial E/\partial K$ is positive and K should be decreased to attain the minimum of E. When K is proper so that the minimum of E is attained, $\partial E/\partial K$ is zero. This leads to using the following relation or law for adjusting K so as to minimize E $$\frac{dK}{dt} = -C\frac{\partial E}{\partial K} \qquad (2)$$

It is this law that the response model type of self-adaptive system shown in FIG. 2 implements. As shown in FIG. 2, the quantity $\partial \epsilon/\partial K$ is computed by means of an active filter 23 which has as its input the response error of the actual system, signal $e$. The output of filter 23 is the quantity $\partial \epsilon/\partial K$ which is multiplied, by means of a conventional multiplier circuit 24, by the error $\epsilon$ between the ideal and actual response which yields $$\epsilon \frac{\partial \epsilon}{\partial K} = \frac{\partial \epsilon^2}{\partial K} = \frac{\partial E}{\partial K} \qquad (3)$$

Passing this signal through an amplifier or similar circuit 25 having a gain C and an integrator network 26 provides the system gain adjust signal at 14 required by the law set forth in Equation 2 whereby to adaptively adjust the over-all control system to minimize the mean-squared-error.

The disadvantages of the model-reference type of system may be explained by again referring to FIG. 4. It will be noted that when K is small, say $K_1$, then the power density spectrum shows a peak at a low frequency which may be associated with the natural frequency of the flight vehicle 10 at the flight condition represented. When K is high, say $K_3$, then the spectrum shows a peak at a high frequency which may be associated with the dynamics of some element of the autopilot such as the actuator and/or the signal conditioning circuits 12. It is well known that such peaks as shown for $K_1$ and $K_3$ are characteristic of a poorly stabilized condition of the autopilot/aircraft feedback control system. The operation of the model-reference self-adaptive system adjusts the gain K to some intermediate value such as $K_2$ for which $\partial E/\partial K$ equals zero and the means-squared-error is a minimum. From a stability standpoint $K_2$ is better than either $K_1$ or $K_3$; however, those skilled in the art of automatic control systems will readily recognize that because $K_2$ was selected only on the basis that it minimized mean-squared-error, the stability with $K_2$ may frequently be poorer than desired. In accordance with the above-mentioned objects, the self-adaptive system of the present invention improves on the model-reference type of system just described by considering both error and stability in determining its gain adjustments. A further disadvantage of the model-reference system described above is that effects at all frequenices are considered identically in determining the gain adjust signal. In the present improved system a plurality of bands of frequencies are considered, and the system is designed to react more quickly to effects occurring in the higher frequency bands where changes occur more rapidly.

Figure 6:
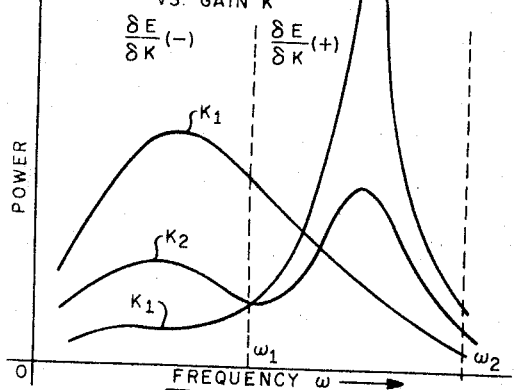

The second type of prior self-adaptive system is referred to as an energy-balance self-adaptive system and is described in my above-mentioned application Ser. No. 281,513. The basic configuration of this type of system is repeated herein as FIG. 3 for convenience and its operation for purposes of the present specification may be explained by reference to FIG. 6. By referring to FIGS. 3 and 2, it will be noted that in this energy-balance system, the optimum response model is assumed to be unity, and thus $\epsilon$ equals $e$. The power density spectrum of $\epsilon$ is shown in FIG. 6 for several values of the adjustable gain K at a given flight condition, and is divided into two frequency bands; one band includes low frequencies for which $\partial E_L/\partial K$ is negative; the other band includes high frequencies for which $\partial E_H/\partial K$ is positive as illustrated in FIG. 6. (More bands could be provided if additional resonances of the autopilot/aircraft feedback control system were significant as evidenced by additional peaks in the power density spectrum.)

Figure 3:
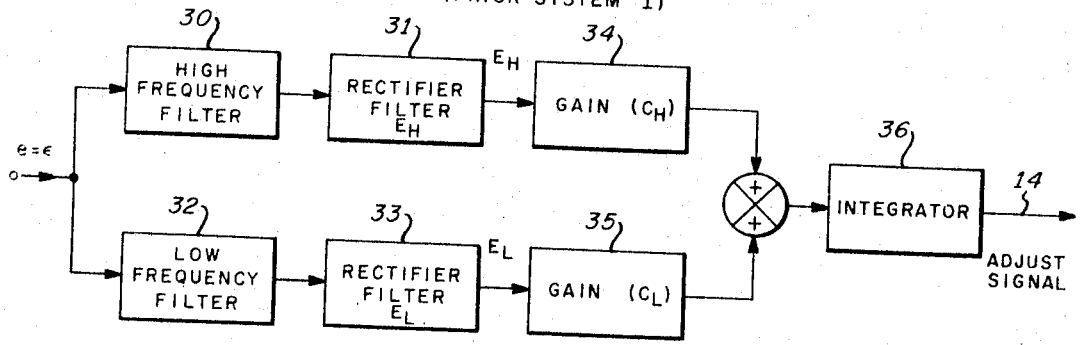

The objective of the operation of the energy-balance self-adaptive system is to achieve a satisfactory degree of stability of the autopilot/aircraft feedback control system and at the same time to reduce the mean-squared-error to command inputs passed through the input filter 15 to its smallest value consistent with stability, by balancing the total energy (power) computed for the low frequency band of frequencies against the total energy (power) computed for the high frequency band of frequencies, see FIG. 6. As shown in FIG. 3, a measure of the high frequency energy $E_H$ is obtained by means of a high frequency band pass filter 30 responsive to the error signal $e=\epsilon$ and a rectifier-filter 31 coupled with the output of filter 30 which approximates a square-law multiplication and averaging. A measure of the low frequency energy $E_L$ is similarly obtained by means of a low frequency filter 32 and a similar rectifier-filter 33. The quantities $E_H$ and $E_L$ obtained in this way approximate the following:

$$E_L = \overline{\epsilon_L{}^2(t)} = \frac{2}{\pi}\int_0^{\omega_1} \Phi(\omega)\, d\omega \quad (4)$$

$$E_H = \overline{\epsilon_H{}^2(t)} = \frac{2}{\pi}\int_{\omega_1}^{\omega_2} \Phi(\omega)\, d\omega \quad (5)$$

The energies $E_L$ and $E_H$ thus obtained are multiplied by gains $C_L$ and $C_H$ which may comprise amplifiers 34 and 35 respectively and which gains are positive and negative respectively and selected, as illustrated, on the basis that the system designer knows apriori that $\partial E_L/\partial K$ is negative for the low frequency band and $\partial E_H/\partial K$ is positive for the high frequency band. The resulting signals are summed and passed through an integrator 36, the output of which is supplied to the adjustable gain circuit 13 of FIG. 1 via lead 14. The energy-balance adaptive system just described adjusts K according to the following law:

$$\frac{dK}{dt} = C_L E_L + C_H E_H$$

Thus K will be adjusted until $C_L E_L$ equals $C_H E_H$, at which time $dK/dt$ will become zero.

Assume for the meantime that the magnitudes of $C_L$ and $C_H$ are unity and $C_H$ is negative as mentioned above. Referring to FIG. 6, when K is low, say $K_1$, then the power density spectrum of $\epsilon$ has a peak in the low frequency band. The energy computed for this band $E_L$ will therefore exceed the energy computed for the high frequency band $E_H$ and thus the gain K will be increased. When K is high, say $K_3$, then the power density spectrum has a peak in the high frequency band. The energy computed for this band $E_H$ will therefore exceed the energy computed for the low frequency band $E_L$ and thus the gain K will be decreased. In each case the increase or decrease of K will continue until an intermediate condition is achieved, say $K_2$, where $E_L$ equals $E_H$. In general, however, the magnitudes of $C_L$ and $C_H$ are not unity. These values are chosen or preselected so that the intermediate gain $K_2$ adjusted by the self-adaptive system provides adequate stability of the autopilot/aircraft feedback control system, and at the same time reduces the mean-squared-error to a minimum value consistent with the degree of stability desired.

The energy-balance self-adaptive system just described operates in a satisfactory manner for a number of different types of flight vehicles and autopilots over a range of operating conditions. The system tolerates rather large changes in the characteristics of the flight vehicle and autopilot provided, however, that the significant resonances do not move out of the respective low and high frequency bands preselected for the particular application. This consideration points out a disadvantage of the energy balance adaptive system, viz. a considerable amount of apriori knowledge must exist and be available to the adaptive system designer in order to allow the frequency bands to be selected so that the above described shift of resonances does not occur. In other words, the characteristics of the flight vehicle and/or autopilot and/or flight conditions must be predetermined or predicted with reasonable accuracy so that the frequencies of the resonances are maintained within the operating range of this type of self-adaptive system. The self-adaptive system of the present invention overcomes this disadvantage. As will be described below, it will accommodate major changes in the frequencies of the important resonances of the autopilot/aircraft feedback control system by virtue of the fact that it recomputes the positive or negative values of the gains $C_L$, $C_H$, etc. applied to each frequency band automatically at each condition of operation.

Discussion of present invention

Figure 8:
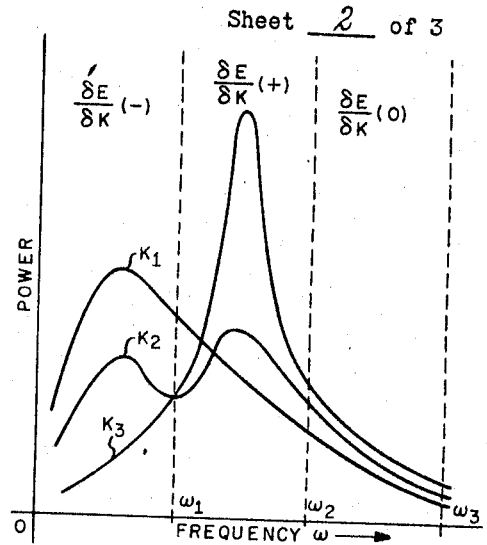
FIGS. 8 and 9 are further graphs which will aid in understanding the principles on which the present invention is based.
Figure 9:
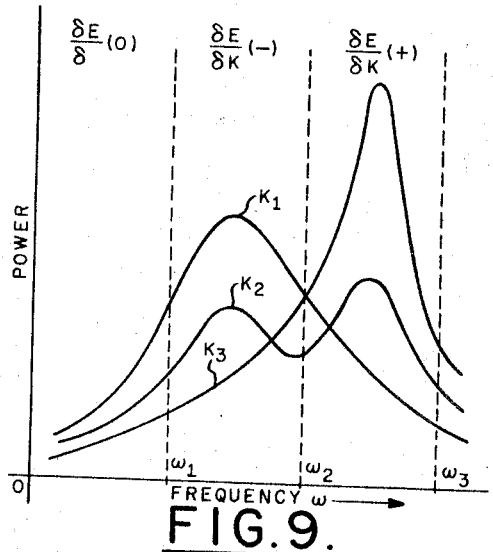

The principles of the present invention now to be described will be readily understood as a result of the foregoing discussion of prior related self-adaptive systems. The implementation of this improved system is illustrated in FIG. 7 and its operation may be explained by reference to FIGS. 8 and 9. It is assumed with this configuration that command inputs are passed through the input filter 15 and that optimum response from $r$ to vehicle rate is represented by the optimum response model 20. FIGS. 8 and 9 show typical power density spectra of the system response error signal $\epsilon$, shown in FIG. 7, at two conditions. For example, the power density spectrum of FIG. 8 corresponds to a relatively low speed flight condition of the vehicle 10 while FIG. 9 illustrates the power density spectrum for the same vehicle at a high speed flight condition. At each condition the spectrum is shown for several values of the adjustable parameter, i.e. the system gain K. It will be noted from FIGS. 8 and 9 that in the example illustrated a major schift occurs in the characteristic resonances of the autopilot/aircraft feedback control system between the two conditions of flight. The power density spectrum is divided into three bands; the low band contains frequencies from 0 to $\omega_1$, the medium band from $\omega_1$ to $\omega_2$, and the high band from $\omega_2$ to $\omega_3$. Of course it will be understood that the number of bands need not be restricted to three as illustrated but may be increased as necessary by the nature of the feedback control system and the conditions expected to be encountered.

At either condition of flight illustrated the energy-balance self-adaptive system of the above-mentioned application Ser. No. 281,513 could be used to adjust the gain K to achieve optimum response. The difficulty is that the same system will not operate for both conditions inasmuch as the quantities $\partial E_L/\partial K$, $\partial E_M/\partial K$ and $\partial E_H/\partial K$ change as a function of the condition, and thus the gains $C_L$, $C_M$ and $C_H$ of a three channel energy-balance adaptive system would have to change magnitude and especially sign correspondingly. What the self-adaptive system of the present invention does then, is to determine the proper values of $C_L$, $C_M$ and $C_H$ automatically through computing the derivatives $\partial E_L/\partial K$, $\partial E_M/\partial K$ and $\partial E_H/\partial K$. The self-adaptive system of the present invention improves the energy-balance system by extending its range of application in terms of the system characteristics, i.e. dynamics of the vehicle and conditions of operation. The computation of the derivatives $\partial E_L/\partial K$, $\partial E_M/\partial K$ and $\partial E_H/K$ are accomplished in a manner similar to the computation of $\partial E/\partial K$ in the above-described model-reference self-adaptive system. Thus, in one manner of speaking, the system of the present invention combines the principles of the energy-balance and model-reference systems to provide an improved system having advantages not obtainable by either alone.

Referring again to FIG 7, there is illustrated a complete block diagram of a three channel adaptive control for adjusting a single parameter, such as system gain K, of the feedback control system of the type shown in FIG. 1. As shown, the over-all control system, as above, includes the vehicle 10 the rate of which, about a particular axis, is controlled by positioning a control surface of the vehicle, through an actuator 12, conventional signal conditioning circuits 12′ and adjustable gain network 13, in response to a command signal $r$ introduced, for example, by a human pilot command input 11 and passed through the input filter 15. Aircraft rate is sensed by a suitable sensor 16, such as a rate sensor, to produce a response signal $c$ representative of the response of the actual system. The command input $r$ is applied to an optimum response model circuit 20, the output $c'$ of which represents the desired or optimum response of the aircraft to $r$ regardless of system configuration or environment. This output is compared with the actual response $c$ of the system to produce an over-all system response error signal $\epsilon$. The command input $r$ is also directly compared with the actual system response $c$ to produce an error signal $e$ representative of the actual system instantaneous error or primary system error and which is applied to the servomotor control circuits 12, 12′ through adjustable gain amplifier 13 which is to be adjusted by the adaptive control. This second instantaneous error signal $e$ is also applied to an active filter circuit 23 which is a circuit representing the feedback control system and which is likewise adjusted by K. Stated another way, the circuit 23 ideally represents the transfer function of the over-all control system "looking in" at a point just after the adjustable gain circuit 13. This circuit, which will be discussed hereinafter, may be thought of as a model of the actual system being controlled. Also, as will be pointed out below, suitable acceptable approximations of the system may be readily employed.

The system response error $\epsilon$ is applied to high, medium and low frequency band pass filters 30, 30′, 30″ respectively, which extract from the frequency spectrum of the response error $\epsilon$ those frequencies in the 0 $\omega_{-1}$, $\omega_1-\omega_2$ and $\omega_2-\omega_3$ bands as shown in FIGS. 8 and 9. Multipliers 31, 31′, 31″, which may be simple rectifier circuits, and low pass filters 32, 32′, 32″ compute the power or energy in each band, viz. $E_H$, $E_M$, $E_L$ respectively, and their outputs may be considered as representing the total energy in each band as in Equations 4 and 5 and as taught in my above-mentioned application Ser. No. 281,513.

The output of active filter 23 represents the change in $\epsilon$ with a change in K or $\partial \epsilon/\partial K$ and is applied to a second set of high, medium and low frequency band pass filters 33, 33′, 33″ which, together with multipliers 34, 34′, 34″ and low pass filters 35, 35′, 35″, compute the values $\partial E_H/\partial K$, $\partial E_M/\partial K$, $\partial E_L/\partial K$ respectively, generally in accordance with FIG. 2 and Equation 3. These quantities and the output quantities of 32, 32′, 32″ are presented as inputs to high, medium and low band multipliers 36, 36′, 36″. The output of the high band multiplier 36 is given by (and the outputs of 36′, 36″ are, of course, similar)

$$E_H \frac{\partial E_H}{\partial K} = \frac{\partial E_H^2}{\partial K} \qquad (7)$$

which is equal to the derivative of the moment of the high frequency of the power density spectrum $(E_H^2)$ with respect to the adjustable gain K. The outputs of low, medium and high channels are summed, as at 37 and passed through a gain circuit 38 having a gain of $-C$ to develop the adjust signal 14 which sets through integrator circuit 39 the adjustable gain K of circuit 13.

It should be noted at this point that the various circuits indicated in block diagram form in the present case may be any conventional circuits for performing the functions indicated. If desired, such circuits may be of the same type as corresponding circuits shown in detail in the above-mentioned co-pending application Ser. No. 281,513.

Thus the self-adaptive control of the present invention as shown in FIG. 7, implements the following relation or law:

$$\frac{dK}{dt} = -C\left[\frac{\partial E_L^2}{\partial K} + \frac{\partial E_M^2}{\partial K} + \frac{\partial E_H^2}{\partial K}\right] \qquad (8)$$

or $$\frac{dK}{dt} = \left(-C\frac{\partial E_L}{\partial K}\right)E_L + \left(-C\frac{\partial E_M}{\partial K}\right)E_M + \left(-C\frac{\partial E_H}{\partial K}\right)E_H \qquad (9)$$

By comparing Equation 9 with the laws for the model-reference system, Equation 2 and the energy-balance system, Equation 6, the present invention generates the gains $C_L$, $C_M$, $C_H$ which are given by $$C_L = -C\frac{\partial E_L}{\partial K} \qquad (10)$$

$$C_M = -C\frac{\partial E_M}{\partial K} \qquad (11)$$

$$C_H = -C\frac{\partial E_H}{\partial K} \qquad (12)$$

It may be shown that the quantity $$E_L^2 + E_M^2 + E_H^2 \qquad (13)$$

is a measure of the total moment of the power density spectrum of the error E and hence the control relation or law for the present invention may be expressed as follows:

$$\frac{dK}{dt} = -C\frac{\partial}{\partial K}[E_L + E_M + E_H] = -C\frac{\partial M}{\partial K} \qquad (14)$$

Equation 14 thus defines the system of the present invention as a power-moment self-adaptive system. It is apparent from Equation 14 that the present invention achieves optimum response of the autopilot/aircraft feedback control system by minimizing the moment of the power density spectrum of E.

The advantages gained by the power-moment self-adaptive system of the present invention over the energy-balance and model-reference systems may be summarized as follows. Relative to the energy-balance system of Ser. No. 281,513 and FIG. 3 hereof, the present system automatically determines the gains $C_L$, $C_M$ and $C_H$ applied to the energies in the various frequency channels, and when the magnitudes and especially the signs of these gains change with flight condition, the present system automatically adjusts them so as to maintain optimum operation of the control system. Relative to the model-reference system of FIG. 2 herein, the present invention is able to achieve a high degree of stability by virtue of the fact that it adjusts the gain K of the over-all control loop in accordance with the mean-squared-error, while at the same time considers the stability of the system. Also, because of the provision of separate channels for the different bands of frequencies the power-moment system can be adjusted to respond more quickly to effects occurring at the higher frequencies where changes in the autopilot/aircraft feedback control system exhibit themselves more rapidly.

A point that needs further explanation is how $\partial E/\partial K$ (or $\partial E_L/\partial K$, $\partial E_M/\partial K$, $\partial E_H/\partial K$) is generated from the instantaneous error signal $e$. This quantity is defined by the relation $$\frac{\partial E}{\partial K} = \frac{\partial}{\partial K}[\overline{\epsilon^2(t)}] \qquad (15)$$

Assuming that the averaging indicated by the bar may be lumped with the low pass filters included in the self-adaptive system of FIG. 7, $$\frac{\partial E}{\partial K} = \epsilon \frac{\partial \epsilon}{\partial K} \qquad (16)$$

The quantity $\epsilon$ is measurable directly; thus the problem is to obtain $\partial \epsilon/\partial K$. This involves the active filter 23 mentioned above. The quantity $\partial \epsilon/\partial K$ is obtained by passing the error signal $e$ (FIG. 7) through the active filter 23 which has a particular transfer function characteristic $T(s)$. The function $T(s)$ ideally is the transfer function of the feedback control system being self-adaptively adjusted by K looking in at the point just after the adjustable gain 13.

Figure 10:
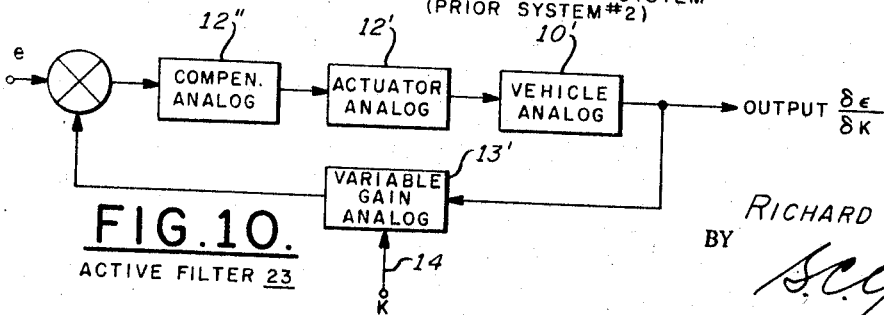
FIG. 10 is a block diagram of a possible form of an active filter employed in the system of FIG. 7.

In FIG. 10 there is illustrated a suitable arrangement for the active filter 23. It comprises circuits 10', 12' and 12" which are electronic analogues of the vehicle 10, actuator 12 and conditioning circuits 12' of the control system of FIG. 7. These circuits may be conventional analogue circuits familiar to servo system designers. The adjustable gain K, block 13', likewise corresponds to the gain circuit 13 of the system of FIG. 7 and is similarly varied by the output K of the adaptive control. The transfer function $T(s)$ of filter 23 should ideally correspond exactly with the transfer function of the system being controlled, including the transfer function of the vehicle 10. However, the transfer function of the vehicle is generally not accurately known apriori or it changes in flight. An identification process may be employed to automatically determine those characteristics not known apriori and which may change in operation. This is the direct approach and various techniques for such parameter identification have been devised. One example is described by the inventor jointly with P. P. Shipley in Technical Report No. ASD-TDR-63-854 (October 1963) entitled "Digital Adaptive Flight Control System, Phase II" and available through the Office of Technical Services, U.S. Department of Commerce, Washington, D.C. Another example is described by M. Margolis and C. T. Leondes in their paper, "A Parameter Tracking Servo for Adaptive Control Systems," which appears in the IRE Transactions on Automatic Controls, November 1959, pp. 100–111.

Another approach is available to implement the characteristics of active filter 23 and that is to employ an approximation to $T(s)$ which improves as the self-adaptive system nears optimum response. Although this is an indirect approach, it is the one that is most convenient from a practical implementation standpoint.

It may be implemented by assuming that the adaptive control is successful in adjusting the over-all system so that its dynamics are close to the optimum response model 20 and that therefore the optimum response model dynamics provide a good estimation of the unknown transfer function $T(s)$. From FIGS. 1 and 7 the actual transfer from $r$ to $c$ is given by $$\frac{C}{R}(s) = \frac{KG_{12}G_{10}G_{16}}{1+KG_{12}G_{10}G_{16}} \qquad (17)$$

assuming that the self-adaptive system adjusts the response to nearly equal the optimum response model we then have $$M(s) \simeq \frac{KG_{12}G_{10}G_{16}}{1+KG_{12}G_{10}G_{16}} \qquad (18)$$

By my definition of $T(s)$ it is given by $$T(s) = \frac{G_{12}G_{10}G_{16}}{1+KG_{12}G_{10}G_{16}} \qquad (19)$$

which is also equal to $$T(s) \simeq \frac{M(s)}{K} \qquad (20)$$

Since the inclusion of the gain term only affects the speed of adaptation of the self-adaptive loop, it may, if desired, be neglected.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a feedback control system having an input, an output, means responsive to said input and output for providing a primary system error, and at least one controllable parameter affecting the response of said output to said primary system error, which response is required to be optimized for variations in the operating conditions of said system, self-optimizing control means for varying said one parameter comprising:
    (a) means responsive to said system input and said system output for producing a response error signal having magnitude and frequency components representative of the response error between a desired optimum response of said system and the actual response of said system,
    (b) frequency responsive means coupled to receive said response error signal for providing a plurality of signals each representative of the energy content of a corresponding plurality of frequency bands of the frequency spectrum of said response error signal,
    (c) means for adjusting said controllable parameter in accordance with the algebraic sum of said plurality of signals,
    (d) an actual response model means responsive to said parameter controlling means and said primary system error for detecting increases and decreases in the energy content of each of said frequency bands due to the adjustment of said parameter, and
    (e) means responsive to said last mentioned means for modifying each of said plurality of signals whereby to control the sense of adjustment of said parameter control means in accordance with shifts in the peaks of the energy in said response error signal from one frequency band to another due to changes in the operating conditions of said over-all control system.

2. Self-optimizing control means as set forth in claim 1 wherein said frequency responsive means comprises a plurality of band pass filters for dividing the total frequency spectrum of said system response error into a plurality of frequency bands and further includes multiplier means responsive to the output of each of said filters for producing said plurality of signals.

3. Self-optimizing control means as set forth in claim 1 wherein said means for producing said response error signal comprises an optimum response model of said system responsive to said system input for providing an output having magnitude and frequency components representative of the desired response of said system to said system input and including means for algebraically combining the output of said optimum response model and said system output.

4. The self-optimizing control means as set forth in claim 1 wherein the means producing the response error signal includes an optimum response model having a fixed known transfer function, wherein said actual response model has a variable but unknown transfer function, and wherein said system parameter controlling means is connected to adjust the transfer function of said actual response model whereby as response of said system approaches that of the optimum response model the response of actual response model approaches the response of said optimum response model.

5. In a feedback control system having an input, an output and at least one controllable parameter affecting the response of said output to said input, which response is required to be optimized for changes in opearting conditions of said system, self-optimizing control means for controlling at least said one parameter comprising:
(a) means responsive to said system input and said system output for producing an error signal having magnitude and frequency components representative of the response error between a desired optimum response of said system and the actual response of said system,
(b) frequency responsive means responsive to said error signal for providing a plurality of signals each representative of the energy content of a corresponding plurality of frequency bands of the total frequency spectrum of said error signal,
(c) means for controlling said parameter in accordance with the algebraic sum of said plurality of signals,
(d) means responsive to said system input and said system output and adjusted in accordance with said parameter controlling means for providing an output representative of the change in response of the actual system as adjusted by said parameter controlling means, and
(e) means responsive to said last mentioned output for modifying each of said plurality of signals whereby to determine the sense of adjustment of said parameter in accordance with shifts in the peaks of the energy of said response error from one frequency band to another due to changes in the operating conditions of said over-all control system.

6. In a feedback control system having an input, an output and at least one controllable parameter affecting the response of said output to said input, which response is required to be optimized for changes in operating conditions of said system, self-optimizing control means for varying at least said one parameter comprising:
(a) means responsive to said system input and said system output for producing an error signal having magnitude and frequency components representative of the response error between a desired optimum response of said system and the actual response of said system,
(b) frequency responsive means responsive to said error signal for providing a plurality of signals each representative of the energy content of a corresponding plurality of frequency bands of the total frequency spectrum of said error signal,
(c) means for controlling said parameter in accordance with the algebraic sum of said plurality of signals,
(d) further means responsive to said system input and said system output and adjusted in accordance with said parameter controlling means for providing an output having magnitude and frequency components representative of the response of the actual system as adjusted by said parameter controlling means,
(e) further frequency responsive means responsive to the output of said last mentioned means for providing a second plurality of signals each representative of the derivative with respect to the adjustment of said parameter of the energy content of the corresponding plurality of frequency bands of the total freqeuncy spectrum of said output, and
(f) means for multiplying each of said first plurality of signals in accordance with corresponding signals of said second plurality of signals whereby to determine the sense of adjustment of said parameter control means.

7. An adaptive control means for a feedback control system in which at least one system parameter is varied by said adaptive control means to optimize the response of said system to a control input under widely varying operating conditions, said adaptive control means comprising:
(a) means defining an optimum response model responsive to the said control input for providing an output representing the desired response of said system to said control input,
(b) means comparing the output of said optimum response model with a signal representing the actual response of said system for producing a first system response error signal,
(c) means responsive to said control input and said actual response signal for producing a second system instantaneous error signal,
(d) means defining a model of the actual system responsive to said second system instantaneous error signal and adapted to be controlled by the output of said adapted control means for providing an output representing the effect of said adaptive control means on said actual system.
(e) first frequency responsive means connected to receive said first system response error signal for dividing the frequency spectrum thereof into a plurality of frequency bands and for providing a corresponding plurality of outputs representative of the energy content of each frequency band,
(f) means combining said plurality of outputs to produce a resultant output and for controlling said system parameter and said actual system model in accordance therewith,
(g) second frequency responsive means connected to receive the output of said actual system model for dividing the frequency spectrum thereof into a like plurality of frequency bands and for providing a corresponding plurality of outputs representative of the rate of change of the energy content of each frequency band produced by said resultant output, and
(h) means for modifying each of said plurality of outputs of said first frequency responsive means in accordance with corresponding outputs of said second frequency responsive means whereby to control said system parameter in accordance with shifts in the peaks of energy from frequency band to frequency band due to variations in the operating conditions of said feedback control system.

References Cited

UNITED STATES PATENTS

| | | | |
|---|---|---|---|
| 3,216,676 | 11/1965 | Brown et al. | 244—77 |
| 3,250,903 | 5/1966 | Vasu et al. | 235—186 |
| 3,308,360 | 3/1967 | Vanderbilt | 318—18 |
| 3,334,282 | 8/1967 | Wolfe | 318—18 |
| 3,340,451 | 9/1967 | Farrand | 318—162 |

MARTIN P. HARTMAN, *Primary Examiner.*

U.S. Cl. X.R.

244—77; 318—18